(12) United States Patent
Zwerger et al.

(10) Patent No.: US 8,195,532 B2
(45) Date of Patent: Jun. 5, 2012

(54) GENERATING INFORMATION FOR USE IN PERFORMING PHYSICAL OPERATIONS

(75) Inventors: Wilhelm Zwerger, Stutensee-BL (DE); Holger Herrmann, Malsch (DE); Thomas Friedrich, Walldorf (DE); Ami Heitner, Kfar-Sava (IL)

(73) Assignee: SAP AG, Walldorf (DE)

( * ) Notice: Subject to any disclaimer, the term of this patent is extended or adjusted under 35 U.S.C. 154(b) by 1052 days.

(21) Appl. No.: 11/321,352

(22) Filed: Dec. 29, 2005

(65) Prior Publication Data

US 2007/0156498 A1 Jul. 5, 2007

(51) Int. Cl.
*G06Q 10/00* (2012.01)
(52) U.S. Cl. .................. 705/28; 700/95; 700/96; 700/99
(58) Field of Classification Search ................ 705/1, 28; 700/95–114
See application file for complete search history.

(56) References Cited

U.S. PATENT DOCUMENTS

| | | | |
|---|---|---|---|
| 6,850,809 B1 * | 2/2005 | Callar et al. .................... | 700/96 |
| 7,162,799 B2 * | 1/2007 | Moore et al. ................. | 29/897.2 |
| 2002/0161654 A1 * | 10/2002 | Uetake et al. ................... | 705/22 |
| 2003/0143515 A1 * | 7/2003 | Fromm-Ayass et al. ........ | 434/72 |
| 2004/0267677 A1 * | 12/2004 | Mitsuoka et al. ............. | 705/400 |

OTHER PUBLICATIONS

'Adonix Geode GX' [online]. Adonix, 2006, [retrieved on Mar. 9, 2006]. Retrieved from the Internet: <URL:www.adonix.us/Adonix_Geode_GX.189.0.html >.

'Advanta Software' [online]. Advanta Software, [retrieved on Mar. 9, 2006]. Retrieved from the Internet: <URL:www.advantasoftware.com.au/home.asp >.

'G.O.L.D. Stock: Integrating your logistics network in your supply chain' [online]. Aldata, [retrieved on Mar. 31, 2006]. Retrieved from the Internet: <URL: www.aldata-solution.fr/eng/products/brochure_stock_2005_en.pdf>.

'G.O.L.D. Pick: Picking zone optimisation' [online]. Aldata, [retrieved on Mar. 31, 2006]. Retrieved from the Internet: <URL: www.aldata-solution.fr/eng/new_and_events/G.O.L.D.%20Pick%20EN.pdf>.

'G.O.L.D. Business Solution: Voice in the warehouse' [online]. Aldata, [retrieved on Mar. 31, 2006]. Retrieved from the Internet: <URL www.aldata-solution.fr/eng/new_and_events/ G.O.L.D.%20Vocal%20EN.pdf>.

(Continued)

*Primary Examiner* — Jami A Plucinski
*Assistant Examiner* — Fathi Abdelsalam
(74) *Attorney, Agent, or Firm* — Fish & Richardson P.C.

(57) ABSTRACT

A method to be performed in a procedure of manufacturing a product includes receiving, in a computer system, a request to initiate a manufacturing procedure including at least a first physical operation modeled as a manufacturing-type operation in the computer system and a second physical operation modeled as a warehouse-type operation in the computer system. Information to be used in the manufacturing procedure, identifying the manufacturing-type operation and the warehouse-type operation, is generated in response to the request. Using the information, the manufacturing procedure including the first and second physical operations is initiated. A post-manufacturing procedure for a product can include a manufacturing-type operation and a warehouse-type operation. A computer system includes an operation management module for managing a manufacturing-type operation and a warehouse-type operation. The computer system includes initiation components for initiating the operations.

21 Claims, 7 Drawing Sheets

OTHER PUBLICATIONS

'G.O.L.D Billing: Logistics services invoicing' [online]. Aldata, [retrieved on Mar. 31, 2006]. Retrieved from the Internet: <URL www.aldata-solution.fr/eng/new_and_events /G.O.L.D.%20Billing%20EN.pdf>.

'Enterprise-wide distribution software and solutions' [online]. Apprise Software, [retrieved on Mar. 9, 2006]. Retrieved from the Internet: <URL www.apprise.com>.

'Aquitec Solutions' [online]. Aquitec, 2004 [retrieved on Mar. 9, 2006]. Retrieved from the Internet: <URL www.aquitecintl.com/solutions/ewms.asp>.

CatalystCommand Warehouse Management [online]. Catalyst International, [retrieved on Mar. 9, 2006]. Retrieved from the Internet: <URL www.catalystinternational.com/content/solution_center/execution/warehousing/management.asp>.

'ClearOrbit' [online]. Clear Orbit, 2006 [retrieved on Mar. 9, 2006]. Retrieved from the Internet: <URL www.clearorbit.com/index.php?sess_id=ab8ee7ae2675c92981a0a13b398c9100>.

'SattStore WMS: Total control and optimization of your automated or manual DC' [online]. Consafe Logistics, 2006 [retrieved on Mar. 9, 2006]. Retrieved from the Internet: <URL www.consafelogistics.com/Warehouse%20Management%20Systems/Products/SattStoreWMS.aspx >.

'Astro WMS: Efficient real-time warehouse management' [online]. Consafe Logistics, 2006 [retrieved on Mar. 9, 2006]. Retrieved from the Internet: URLwww.consafelogistics.com/Warehouse%20Management %20Systems/Products/AstroWMS.aspx >.

'Effect Warehouse: Easily implemented, cost-effective and robust' [online]. Consafe Logistics, 2006 [retrieved on Mar. 9, 2006]. Retrieved from the Internet: <URL www.consafelogistics.com/Warehouse%20Management%20Systems/Products/Effect_Warehouse.aspx >.

'CorePartners' [online]. CorePartners, 2006 [retrieved on Mar. 9, 2006]. Retrieved from the Internet: <URL: www.coreims.com >.

'Daifuku Warehouse Rx WMS software' [online]. Daifuku Company, 1998-2005 [retrieved on Mar. 9, 2006]. Retrieved from the Internet: <URL www.daifukuglobal.com/daifuku/ global/products /f_wmssoftware_1.asp >.

'Supply chain execution' [online]. Epicor , [retrieved on Mar. 9, 2006]. Retrieved from the Internet: <URLwww.epicor.com/www/products/enterprise/scm/warehousing.htm >.

'Warehouse management—SCE' [online]. Fascor, 2005[retrieved on Mar. 9, 2006]. Retrieved from the Internet: <URL www.fascor.com/faswms05.htm >.

'Foxfire Technologies' [online]. Foxfire Technologies, [retrieved on Mar. 9, 2006]. Retrieved from the Internet: <URL: www.foxfiretechnologies.com>.

'FKI Logistix White Systems launches SpectrumPlus Warehouse Control System' [online]. FKI Logistix, 2000-2005 [retrieved on Mar. 9, 2006]. Retrieved from the Internet: <URL:www.fkilogistex.com/ media-center/press-releases/default.aspx?pid=181-2&k=spectrum%20plus&m=0&y=0 >.

SmartEnterprise 2: An integrated software suite for comprehensive 3PL management [online]. Headwater Technology Solutions, [retrieved on Mar. 9, 2006]. Retrieved from the Internet: <URL: www.Headwaterinc.com/download/HW_SmartEnterprise.pdf>.

'HighJump Software: Your partner for long-term competitive advantage' [online]. HighJump Software, 2000-2006 [retrieved on Mar. 9, 2006]. Retrieved from the Internet: <URL: www.highjumpsoftware.com/SupplyChainAdvantage/Difference >.

'ICS Logimax' [online]. ICS, [retrieved on Mar. 9, 2006]. Retrieved from the Internet: <URL: www.e-logimax.com/downloads/lmx_overvew.pff>.

'Infor' [online]. Infor, 2006[retrieved on Mar. 9, 2006]. Retrieved from the Internet: <URL: www.infor.com >.

'INTEK: Warehouse librarian' [online]. INTEK Integration Technologies, 2004 [retrieved on Mar. 9, 2006]. Retrieved from the Internet: <URL: www.intek.com>.

'Irista Warehouse' [online]. Irista, 2006 [retrieved on Mar. 9, 2006]. Retrieved from the Internet: <URL: www.irista.com>.

'IRMS Warehouse management system' [online]. Integrated Warehouing Solutions (IWS) , [retrieved on Mar. 9, 2006]. Retrieved from the Internet: <URL: www.irmswms.com/>.

'IntelliTrack Warehouse management system' [online]. IntelliTrack , 2005 [retrieved on Mar. 9, 2006]. Retrieved from the Internet: <URL: www.intellitrack.net/warehouse_management_system_wms.asp>.

'IntelliTrack slap and ship' [online]. IntelliTrack, [retrieved on Mar. 9, 2006]. Retrieved from the Internet: <URL: www.intellitrack.net/upgrades_downloads.asp ftp://ftp.intellitrack.net/DataSheets/Slap& Ship.pdf>.

'Logility Voyager WarehousePRO' [online]. Logility, 2006 [retrieved on Mar. 9, 2006]. Retrieved from the Internet: <URL: www.logility.com/solutions/warehousemgt.html >.

Manhattan associates: A complete set of supply chain solutions [online]. Manhattan Associates, [retrieved on Mar. 9, 2006]. Retrieved from the Internet: <URL: www.manh.com >.

'rf navigator EMMS' [online]. Majure Data, 2005 [retrieved on Mar. 9, 2006]. Retrieved from the Internet: <URL: www.majuredate.com>.

'Mincron: Distribution and Warehousing Software' [online]. Mincron, [retrieved on Mar. 9, 2006]. Retrieved from the Internet: <URL: www.mincron.com/index_1024.htm >.

'Microlistics: ISIS Enterprise' [online]. Microlistics, 2002 [retrieved on Mar. 9, 2006]. Retrieved from the Internet: <URL: www.microlistics.com/micro/products/isisenterprise.jsp >.

'Microlistics: ISIS Express' [online]. Microlistics, 2002 [retrieved on Mar. 9, 2006]. Retrieved from the Internet: <URL: www.microlistics.com/micro/products/isisexpress.jsp >.

'Microlistics: ISIS 3PL' [online]. Microlistics, 2002 [retrieved on Mar. 9, 2006]. Retrieved from the Internet: <URL: www.microlistics.com/micro/products/isisenterprise.jsp >.

'Navis' [online]. Navis, [retrieved on Mar. 9, 2006]. Retrieved from the Internet: <URL: www.navis.com/home.jsp>.

'Open Business Solutions: Calidus-e' [online]. Open Business Solutions, 2004 [retrieved on Mar. 9, 2006]. Retrieved from the Internet: <URL: www.openbusinesssolutions.co.uk/index.html >.

'Oracle Corporation' [online]. Oracle, 2006 [retrieved on Mar. 9, 2006]. Retrieved from the Internet: <URL: www.oracle.com/index.html>.

'Provia: FourSite OMS' [online]. Provia, 2006 [retrieved on Mar. 9, 2006]. Retrieved from the Internet: <URL: www.provia.com/ProductSolutions/FourSiteOMS/default.htm?ave=WM>.

'Provia: ViaWare WMS' [online]. Provia, 2006 [retrieved on Mar. 9, 2006]. Retrieved from the Internet: <URL: www.provia.com/ProductSolutions/ViaWareWMS/default.htm?ave=WM>.

'PSI Logistics: PSIwms' [online]. PSI Logistics, 2005 [retrieved on Mar. 9, 2006]. Retrieved from the Internet: <URL: www.psilogistics.com/warehouse-management/en >.

'QSSI: PowerHouse/WMS' [online]. QSSI, 1985-2005[retrieved on Mar. 9, 2006]. Retrieved from the Internet: <URL: www.qssi-wms.com/>.

'Radcliffe: ROC RFID' [online]. Radcliffe, 2005[retrieved on Mar. 9, 2006]. Retrieved from the Internet: <URL: www.radcliffeinc.com/cws/index.jsp?name=NVs9CB8B6w>.

Radio Beacon—Warehouse Management Software [online]. Radio Beacon, 2005 [retrieved on Mar. 10, 2006]. Retrieved from the Internet:<URL: www.radiobeacon.com/Solution/RadioBeaconWMS.aspx >.

'RedPrairie: Warehouse' [online]. RedPrairie, [retrieved on Mar. 10, 2006]. Retrieved from the Internet: <URL: www.redprairie.com/Warehouse%20Managemet/default.aspx >.

Retalix: Triceps Warehouse Management [online]. Retalix, 2006[retrieved on Mar. 10, 2006]. Retrieved from the Internet: <URL: www.retalix.com/index.cfm?pageid=546 >.

'Retalix: MDS Yard & Dock Control' [online]. Retalix, 2006[retrieved on Mar. 10, 2006]. Retrieved from the Internet: <URL: www.retalix.com/index.cfm?pageid=550 >.

'Robocom: Warehouse Management Solutions' [online]. Robocom, 2004[retrieved on Mar. 10, 2006]. Retrieved from the Internet: <URL: www.robocom.com/ >.

'RT Systems: RT Locator' [online]. RT Systems, 2005[retrieved on Mar. 10, 2006]. Retrieved from the Internet: <URL: www.t-systems.com/ >.

'Connecting a Fully Automated Warehouse' [online]. SAP, [retrieved on Mar. 6, 2006]. Retrieved from the Internet: <URL: //help.sap.com/saphelp_nw04/helpdata/en/52/16ab2e543311d1891c0000e8322f96/cont>.

'Connecting a Semi-Automated Warehouse' [online]. SAP, [retrieved on Mar. 6, 2006]. Retrieved from the Internet: <URL://help.sap.com/saphelp_nw04/helpdata/en/52/16ab21543311d1891c0000e8322f96/cont>.

Scenarios for connecting external systems [online]. SAP, [retrieved on Mar. 6, 2006]. Retrieved from the Internet: <URL: http://help.sap.com/saphelp_nw04/helpdata/en/52/16aafa543311d1891c0000e8332f96/conte>.

'SAP: mySAP Supply Chain Management' [online]. SAP, [retrieved on Mar. 10, 2006]. Retrieved from the Internet: <URL: www.sap.com/usa/solutions/business-suite/scm/pdf/BWP_WM_LES.pdf>.

'Savant Software: Shipping Manifest System' [online]. Savant Software, 2006[retrieved on Mar. 10, 2006]. Retrieved from the Internet: <URL: www.savantwms.com/main.asp?sec=solutions>.

'Scenic Technology: On demand warehouse management software' [online]. Scenic Technology, [retrieved on Mar. 10, 2006]. Retrieved from the Internet: <URL: www.scenictechnology.com/ >.

'Siemens Logistics & Assembly: Dematic' [online]. Seimens Logistics & Assembly, 2006 [retrieved on Mar. 10, 2006]. Retrieved from the Internet: <URL: www.logistics-assembly.siemens.com/docs/stc_corp_home_fl.asp?id=23385&sp=E&ml=23384&m2=23385& m3=&domid=1029&zfz=2004930-33982-47 >.

'SSA Global: SSA ERP' [online]. SSA Global, [retrieved on Mar. 10, 2006]. Retrieved from the Internet: <URL: www.ssaglobal.com/documents/ssa_erp_erp_lx_release.doc >.

'Sterling Commerce: Network Warehouse Management System' [online]. Sterling Commerce, 2006[retrieved on Mar. 10, 2006]. Retrieved from the Internet: <URL: www.sterlingcommerce.com/About/ News/ WarehouseManagementReport.htm >.

'Swisslog: Warehouse manager' [online]. Swisslog, 2004[retrieved on Mar. 10, 2006]. Retrieved from the Internet: <URL: www.swisslog.com/wds-index/wds-sw/wds-sw-wm.htm >.

'Swisslog: Automation Manager' [online]. Swisslog, 2004[retrieved on Mar. 10, 2006]. Retrieved from the Interent: <URL: www, http://www.swisslog.com/wds-index/wds-sw/wds-sw-am.htm >.

'Tecsys: Warehouse Management Software' [online]. Tecsys, [retrieved on Mar. 10, 2006]. Retrieved from the Internet: <URL: www.tecsys.com/products/wms.shtml >.

'Tecsys: Pointforce Distribution Management System' [online]. Tecsys, [retrieved on Mar. 10, 2006]. Retrieved from the Internet: <URL: www.tecsys.com/products/dms/capabilities.shtml >.

'Wolin Design Group: da Vinci Supply Chain Business Suite/ Icon WMS' [online]. Wolin Design Group, 2004 [retrieved on Mar. 10, 2006]. Retrieved from the Internet: <URL: www.wdgcorp.com/ >.

"E71-MTO Order Processing", *mySAP All-in-One*, Release V3.46C, Jul. 2003.

* cited by examiner

US 8,195,532 B2

GENERATING INFORMATION FOR USE IN PERFORMING PHYSICAL OPERATIONS

TECHNICAL FIELD

The description relates to generating information to be used in performing a manufacturing-type operation and a warehouse-type operation.

BACKGROUND

There exists systems for computerized automation of operations and processes in industrial or other commercial enterprises. Examples of such existing systems are those available from SAP AG in Walldorf (Baden) Germany. Some of the existing systems are intended for use with the logistic procedures and operations that are common in manufacturing processes and they are therefore typically used in production plants. Other systems, or components of systems, are intended for use in the logistic management of products that have already been manufactured. They are therefore typically used in warehouses, distribution centers and other facilities where goods may be inspected, repacked and moved to particular storage locations while awaiting shipment.

The distribution of responsibilities and functionality between these two categories of systems is based on the way that these industries have emerged and developed historically. That is, over decades in the past, production plants and similar facilities have carried out their operations according to well-established routines that involve the basic steps of making the product.

Both the manufacturing world and the warehousing world have emerged and modernized significantly over the years, and improvements in technology have changed the way certain tasks are performed. However, the general logistic view of how the core constituents of the manufacturing process is carried out has not changed as significantly. Similarly, warehouses have traditionally been viewed as facilities mainly for logistic management of goods without significant modification and, thus, essentially non-manufacturing in nature.

This view is reflected in the existing systems. It is believed that no existing system attempts to provide a holistic solution for both the manufacturing world and the warehousing world. The computer models that manufacturing systems use for the different components of the process are typically specialized and heavily flavored by the traditional manufacturing view. Systems for warehouse management, in contrast, have other computer models that are targeted toward managing the logistics of storing and eventually delivering goods. A disadvantage of existing systems, then, is that they are designed and configured for only their type of process and lack flexibility in adapting to new demands in the industry and the marketplace that challenge the traditional views.

SUMMARY

The invention relates to performing a manufacturing-type operation and a warehouse-type operation.

In a first general aspect, a method to be performed in a procedure of manufacturing a product includes receiving, in a computer system, a request to initiate a manufacturing procedure for a product. The manufacturing procedure includes at least a first physical operation modeled as a manufacturing-type operation in the computer system and a second physical operation modeled as a warehouse-type operation in the computer system. The method includes generating, in response to the request, information to be used in the manufacturing procedure. The information identifies the manufacturing-type operation and the warehouse-type operation. The method includes initiating, using the information, the manufacturing procedure including the first and second physical operations.

Implementations can include any or all of the following features. The first physical operation may be a make-type operation that transforms a material of the product and the second physical operation may be a pack-type operation that transforms a logistic operations object associated with the product. There may be generated in the computer system a production order object that describes the physical operation, and the logistic operations object may be included in the production order object upon the generation. The method may further include dynamically determining a bill of materials for the logistic operations object. The method may further include evaluating at least one additional restriction on the pack-type operation that the computer system applies for use of the pack-type operation in the manufacturing-procedure. The make-type operation may be modeled such that, when it is used without the pack-type operation, the make-type operation is associated with an output in the computer system, and the make-type operation may precede the pack-type operation in the manufacturing procedure, and the method may further include associating the output with the pack-type operation instead of with the make-type operation. The first physical operation may be a make-type operation that transforms a material of the product and the second physical operation may be a move-type operation that physically moves the product. The second physical operation may be such that it can be performed in the manufacturing procedure either as the manufacturing-type operation or as the warehouse-type operation, and the method may further include automatically applying decision logic to select one of the types for the second physical operation. Automatically applying the decision logic may involve deciding whether to perform the second physical operation as a make-type operation that transforms a material of the product or as a pack-type operation that transforms a logistic operations object associated with the product. The manufacturing procedure may be performed upon the initiation and result in the product being manufactured, and the method may further include performing at least one additional physical operation on the manufactured product in a warehouse, the at least one additional physical operation being modeled as a warehouse-type operation in the computer system.

In a second general aspect, a method to be performed in a procedure of managing a product includes receiving, in a computer system, a request to initiate a post-manufacturing procedure for a product. The post-manufacturing procedure includes at least a first physical operation modeled as a manufacturing-type operation in the computer system and a second physical operation modeled as a warehouse-type operation in the computer system. The method includes generating, in response to the request, information to be used in the post-manufacturing procedure. The information identifies the manufacturing-type operation and the warehouse-type operation. The method includes initiating, using the information, the post-manufacturing procedure including the first and second physical operations.

Implementations can include any or all of the following features. The first physical operation may be a make-type operation that transforms a material of the product and the second physical operation may be a move-type operation that physically moves the product. The second physical operation may be such that it can be performed in the post-manufacturing procedure either as the manufacturing-type operation or as the warehouse-type operation, and the method may further include automatically applying decision logic to select one of the types for the second physical operation. Automatically applying the decision logic may involve deciding whether to perform the second physical operation as a make-type operation that transforms a material of the product or as a pack-type operation that transforms a logistic operations object associated with the product. The post-manufacturing procedure may be performed in a warehouse after performance of a manufacturing procedure in a production plant, and the method may further include performing at least one initial physical operation on the product in the manufacturing procedure, the at least one initial physical operation being modeled as a manufacturing-type operation in the computer system.

In a third general aspect, a computer system includes an operation management module for managing operations performed with regard to a product. The operation management module is configured for managing a first physical operation modeled as a manufacturing-type operation in the computer system and a second physical operation modeled as a warehouse-type operation in the computer system. The computer system includes a first initiation component configured to initiate the first physical operation upon being triggered by the operation management module. The computer system includes a second initiation component configured to initiate the second physical operation upon being triggered by the operation management module.

Implementations can include any or all of the following features. The operation management module may use request objects and information collection objects for triggering each of the initiation components to initiate their respective physical operations, the request objects corresponding to a request to initiate the physical operations and the information collection objects being configured to represent performance of the physical operation. The operation management module may further use (1) order objects that describe the respective physical operations, (2) at least one task object for each of the physical operations, the task object corresponding to a predefined task that is a portion of the physical operation, and (3) a confirmation object for each of the physical operations, the confirmation object confirming the physical operation. The computer system may further include a master data repository that is shared for use with the first and second physical operations. The computer system may further include an inventory management module that is shared for use with the first and second physical operations.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
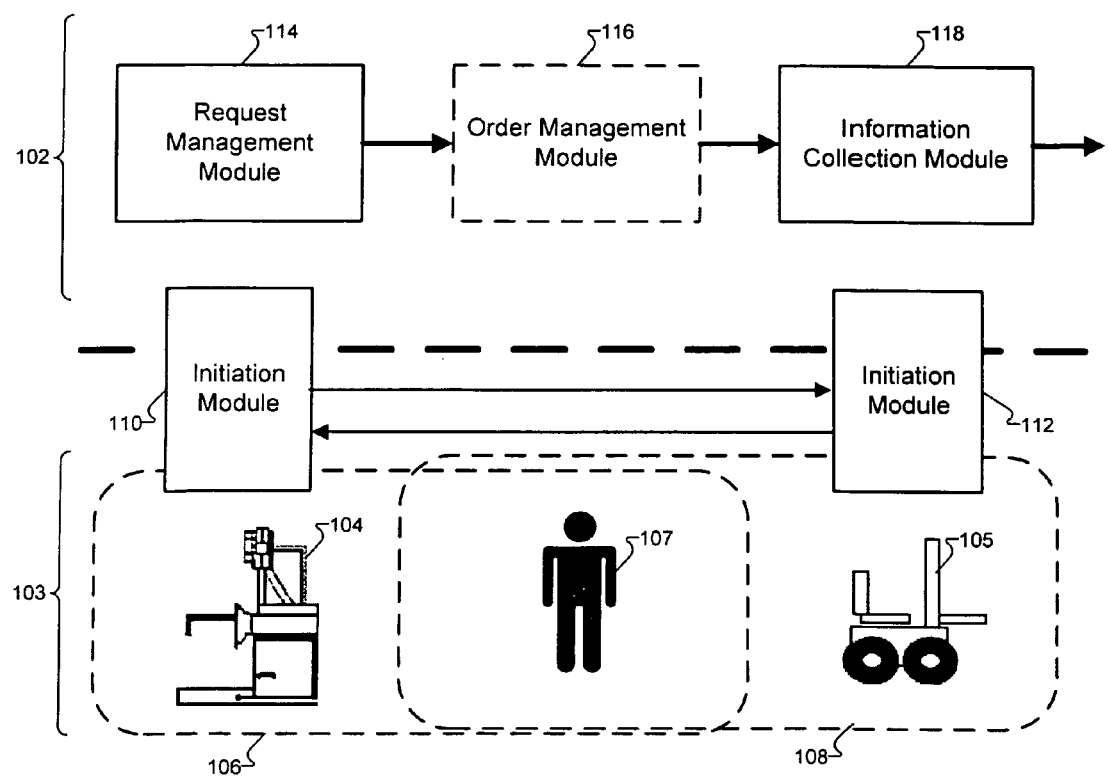
FIG. 1 is a block diagram of a facility that integrates manufacturing-type operations and warehousing-type operations into one logistics model.

FIG. 1 is an exemplary block diagram of a facility 100 that can integrate manufacturing-type operations and warehousing-type operations. The facility 100 has a computer environment 102 that can plan, initiate and control physical operations in a physical environment 103. Particularly, the computer environment 102 controls both manufacturing-type operations and warehousing-type operations, and can perform procedures including both types of operations.

The facility 100 may contain machines such as automation equipment 104 or forklifts 105, as well as operators 107 and other personnel to perform physical operations. For example, machines may make products or move items around the facility 100, while operators 107 may operate or supervise the machines. The automation equipment 104 and operators 107 may be located in a particular facility, such as a production plant 106, whereas the forklifts 105 and their operators 107 may be located in a warehouse facility 108. Each facility 100 can perform the operations traditionally associated with it, and can also perform operations predominantly associated with the other. For example, the production plant 106 may have machinery or operators that pack products in the plant 106. Further, the warehouse 108 may have machinery or operators that make products.

Moreover, the physical environment 103 may represent a merging of the manufacturing world and the warehousing world. That is, the facility 100 may be configured such that there is no distinct point where manufacturing ends and warehousing begins. For example, a business approach such as "assemble to order and ship" may be practiced using the physical environment 103. Such implementations may have allow stock levels to be kept lower, provide shorter supply cycles and minimize stock shortage at stores.

Operations in both the production plant 106 and the warehouse 108 may be triggered by a module in the computer environment 102. The computer environment 102 includes initiation modules for initiating physical operations performed by the machinery or the personnel. An initiation module 110 may initiate an operation in the production plant 106. For example, a first operation in the production plant 106 may include transforming a material to create a product. An initiation module 112 may initiate a warehousing-type procedure for an operation in the warehouse 108. For example, the initiation module 112 may send a request to an operator to perform a specific task, such as moving a product to a specific area. Requests may be initiated directly, such as by sending the operation request to the automated forklift 105 that obtains the requested material from the inventory. Alternately, the request may be initiated indirectly, such as by sending a message to an operator to obtain the requested material from the inventory.

The computer environment 102 generates information for use in a procedure. The generated information will be used in initiating, and sometimes performing, the procedure and may identify both a production type operation and a warehousing-type operation. The computer environment 102 here includes a request management module 114, an order management module 116, and an information collection module 118. The request management module 114 receives operation requests triggered by system users to initiate production or warehouse procedures, such as moving a specific material or packing a product for shipment. The requests may be generated upon the user entering a sales order, for example.

In an order-less implementation, the request management module may initiate a procedure using the initiation modules 110 or 112. In other implementations, the order management module 116 may generate an order object that describes the physical operations to be performed. The order object plans the actual manufacturing-type or warehousing-type operations and the labor or other resources available to carry out the operations. For example, if a request is made to create product A, several procedures may be involved in completing the requested task. The product A could be built from raw material, which may need to be purchased or removed from inventory. Several other steps may be involved before the product A ships including packing the product into a shipping box. The order management module 116 may organize all of the procedures and data involved with incoming requests and make the organization data available to other users in the computer environment 102.

Based on the order object, or directly from the request in an order-less implementation, the information collection module 118 may be initiated. The information collection module 118 can generate an information collection object that collects actual data from the performance of the physical operation(s) in the physical environment 103. The information collection module 118 makes the data available for purposes of confirming the performed operations, updating a fulfillment status of the order object, adjusting inventory records or for determining costs.

Figure 2:
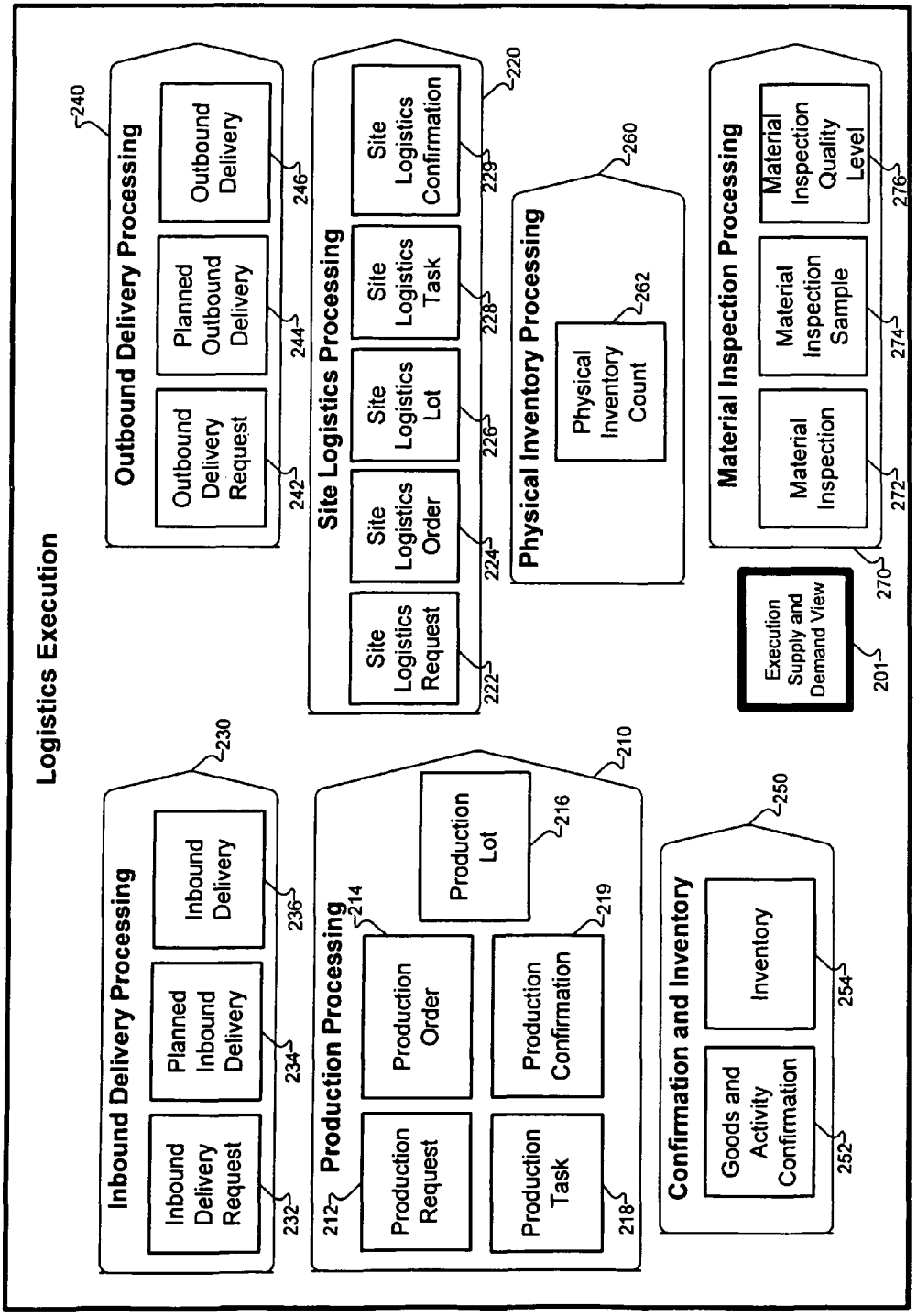
FIG. 2 is a block diagram of a logistics execution module.

FIG. 2 shows a logistics execution module 200 used in planning and executing physical operation(s), such as in the production plant 106 or the warehouse 108.

The logistics execution module 200 contains a site logistics processing component 220 that includes the information relating to the performance of physical operations in a post-manufacturing scenario. The logistics execution module 200 also contains a production processing component 210 having a structure similar to that of the logistics execution module 200 and that includes the information relating to the performance of physical operations in the production plant 106.

Here, the site logistics component 220 includes five business objects: a site logistics request 222, a site logistics order 224, a site logistics lot 226, a site logistics task 228 and a site logistics confirmation 229. The site logistics order 224 is an object used to describe the planning of processes. Particularly, the site logistics order 224 defines which resources are required to perform site logistics processes. The site logistics lot 226 is an object that is used to execute a site logistics process. The site logistics lot 226 may collect data for a site logistics process and may document its progress. The site logistics request 222 is a request to perform logistics operations at a certain time that support outbound, inbound and site logistics processes. The site logistics request 222 represents the internal view of execution. It may contain information about the execution and this information may be arranged in one or more segments. The site logistics request 222 communicates with the entity that triggered it, such as a sales order, and provides site logistics functionalities, such as site logistics order initiation and site logistics lot creation.

The site logistics task 228 is an object that reflects the organization of work to be performed at a site. The site logistics task 228 divides the site logistics process into self-contained work items. The tasks are to be executed by one or more persons, or by an automation system, involved in the site logistics process. The workers receive all the instructions they need to execute a task via the user interface, and are requested to input actual data. The site logistics confirmation 229 is a document that is used to confirm any changes to physical stock quantities (for example, as a result of goods movements). It includes information about inventory changes, deviations from plan, execution timestamps, and the users and resources involved. The site logistics confirmation 229 updates inventory, finance, and planning.

The production processing component 210 may contain objects that correspond in function to the respective site logistics request 222, the site logistics order 224, the site logistics lot 226, the site logistics task 228 and the site logistics confirmation 229. The production processing component 210 manages the preparation and execution of production processes. Here, the production component 220 includes five business objects: a production request 212, a production order 214, a production lot 216, a production task 218 and a production confirmation 219. The production order 214 is an object used to describe the planning of processes. Particularly, the production order 214 defines which resources are required to perform production processes. The production lot 216 is an object that is used to execute a production process. The production lot 216 may collect data for a production process and may document its progress. The production request 212 is a request to perform production operations at a certain time that support outbound, inbound and production processes. The production request 212 represents the internal view of execution. It may contain information about the execution and this information may be arranged in one or more segments. The production request 212 communicates with the entity that triggered it, such as a work order, and provides production functionalities, such as production order initiation and production lot creation.

The production task 218 is an object that reflects the organization of work to be performed at a site. The production task 218 divides the site logistics process into self-contained work items. The tasks are to be executed by one or more persons, or by an automation system, involved in the production process. The workers receive all the instructions they need to execute a task via the user interface, and are requested to input actual data. The production confirmation 219 is a document that is used to confirm any changes to physical stock quantities (for example, as a result of goods movements). It includes information about inventory changes, deviations from plan, execution timestamps, and the users and resources involved. The production 219 updates inventory, finance, and planning.

The site logistics processing component 220 and the production processing component 210 interact with several other process components. In the following, exemplary interactions will be described that involve the logistics processing component 220, and they can also be used with the production processing component 210. The first of these process components, an inbound delivery processing component 230, constitutes logistics execution driven by an inbound delivery request 232 for receiving goods from a vendor. The inbound delivery processing component 230 combines all tasks concerning the inbound delivery process, such as preparation and triggering of execution. It also enables communication with the vendor and invoicing. In this example, the inbound delivery processing component 230 works with three documents that will now be described.

The inbound delivery processing component 230 first creates an inbound delivery request 232 which is a document that contains all relevant logistics data from the component that initiates the inbound delivery process, such as a purchase order. The inbound delivery request 232 is used to validate an inbound delivery and for advance shipping notification, as well as for preparing inbound logistics for receiving the goods. During the execution, the site logistics processing component 220 updates the inbound delivery processing component 230 with actual data.

The inbound delivery processing component 230 also uses a planned inbound delivery 234 and an inbound delivery 236. The planned inbound delivery 234 is a document at the recipient's site that contains information on the planned receipt of goods from a supplier. The document may be based on an advance shipping notification received from the supplier. The inbound delivery document records the goods that have actually been received, for example using a delivery note from the supplier. Upon completion of execution, the site logistics processing component 230 finalizes the inbound delivery object created as part of the inbound delivery processing component 230.

The processing components 210 and 220 also interact with an outbound delivery processing component 240 that is responsible for controlling the outbound processing of goods. For example, the outbound delivery processing component 240 constitutes logistics execution driven by an outbound delivery request for shipping goods to a product recipient. The outbound delivery processing component 240 combines all tasks concerning the outbound delivery process, such as preparation and triggering of execution. It also enables communication with the product recipient and invoicing.

The execution of the process is managed by the site logistics processing component 220 or the production processing component 210. The outbound delivery processing component 240 first creates an outbound delivery request 242. This is a document in the outbound delivery process that contains all the relevant logistics data from the component that initiates the outbound delivery process, such as a sales order. The outbound delivery request is used to prepare outbound logistics for shipping the goods. The outbound delivery processing component 240 generates a planned outbound delivery document 246 which groups (or splits) outbound delivery requests 242 into planned deliveries of goods from a supplier to a recipient. The outbound delivery request 242 can be updated if changes occur in the planned outbound delivery. During execution of site logistics processing, the site logistics request 222 triggers the creation of an outbound delivery object, which is a document that records the goods that are delivered to a product recipient as the basis for a delivery note, and the confirmation of the goods actually received by the recipient. Upon completion of execution, the site logistics request 222 triggers finalization of the outbound delivery object.

A third processing component with which the components 210 and 220 interact is a material inspection processing component 270. The material inspection processing component 270 is responsible for planning and executing quality inspection documents. The interaction model can be divided into two main parts: the planning phase and the execution phase. In the planning phase, the material inspection processing component 270 determines the necessity for quality inspection for each of the provided products. At that point, all material inspection documents within the material inspection processing component 270 are created. In the execution phase, the site logistics lot 226 is created with a corresponding site logistics task 228. The user who performs the quality inspection test will be able to navigate from the relevant task user interface (UI) to the UI for the material inspection processing. The actual reporting of quality inspection results will be done within the material inspection processing component 270. After finalizing the quality inspection reporting, the process control returns to the site logistics processing component 220. Stock quality decisions that are made within the material inspection processing component 270 will serve as a basis for stock category updates (if required). Stock category updates will be carried out by the site logistics processing component 220. The material inspection processing component 270 contains respective objects for material inspection 272, material inspection sample 274 and for material inspection quality level 276.

The components 210 and 220 also interact with a confirmation and inventory processing component 250. For example, the site logistics processing component 220 deals with the execution of processes within the site (e.g., moving, packing, counting etc.), and these stock changes must be updated in the inventory. The site logistics processing component 220 interacts with an inventory object 254 in the confirmation and inventory processing component 250.

The various process and production components may interact with the purpose of planning, executing or documenting the manufacturing, transforming, receiving, transporting or shipping of goods and products. For example, the inbound delivery module 230 may receive a request for a make-type operation and send instructions to the site logistics module 220 for scheduling and costing analysis. Then, the request may be sent to the production module 210 to give instructions on how to make the requested item. Upon completion of making the requested item, the production module 210 sends a document to the material inspection module stating that the finished goods are ready to be inspected. The production module may send an updated document to the confirmation and inventory module as well as the physical inventory module 260 specifying where the new item is located in the physical environment 103. The site logistics module 220 can then send a document to the outbound delivery module 240 stating that the item is ready for shipping.

Figure 3:
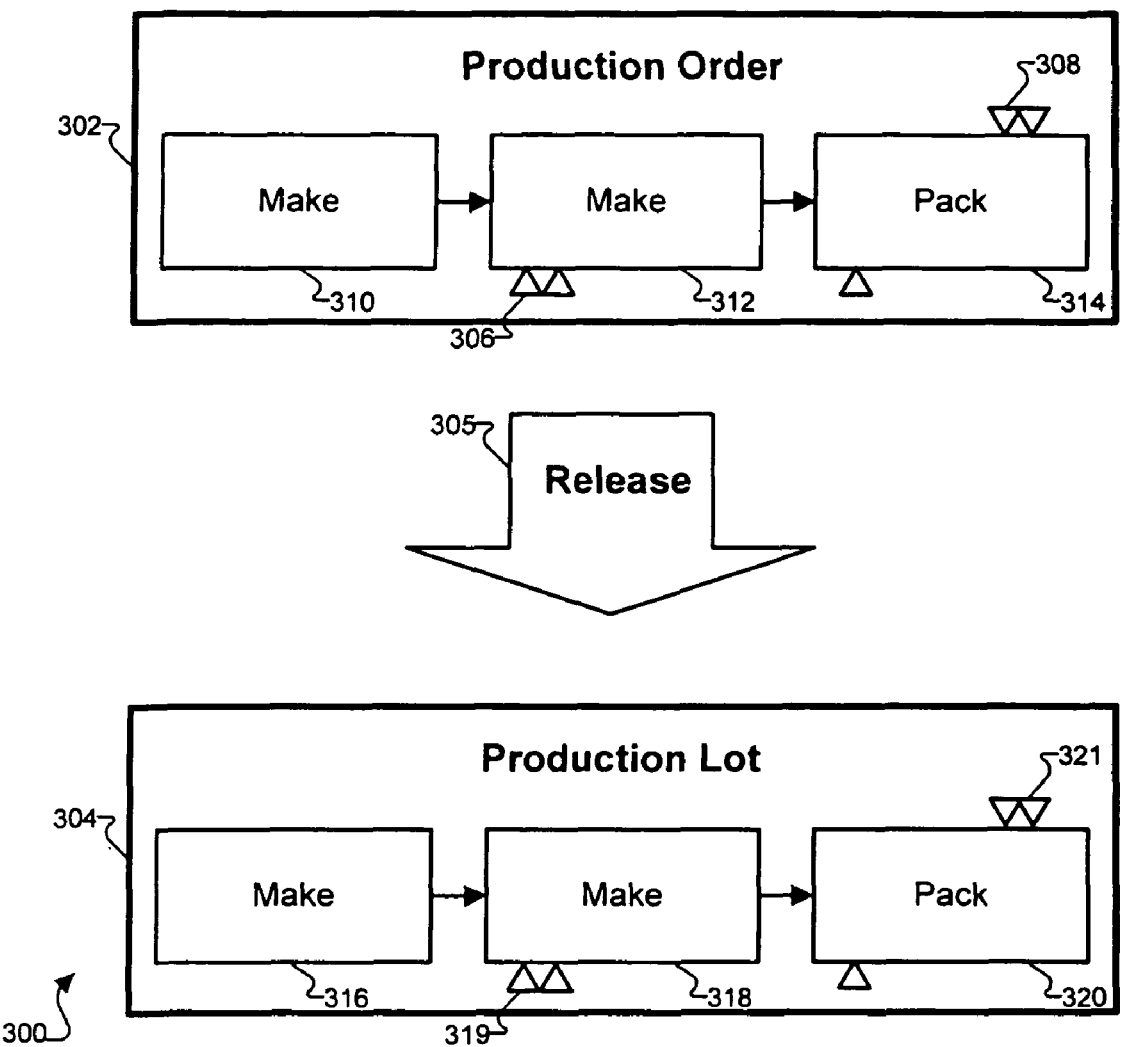
FIG. 3 shows an example of a procedure than can be performed in a production environment.

FIG. 3 schematically shows an example of information that can be used in executing one or more physical operations. Information 300 contains a production order 302 and a production lot 304. The production order 302 is an object that is used to model and describe production processes. In particular, the production order 302 defines which components and resources are required to produce a material or product. The production lot 304 is an object that is used to execute the production of a product. The production lot 304 may collect data for a production process and may document its progress. The production lot 304 may be generated when the production order 302 is released, as shown by an arrow 305. Both the production order 302 and the production lot 304 contain operations. The operations may be production type operations or warehouse type operations or a combination of both. Each operation includes at least one activity. Exemplary activities include making a component for a product or packing the finished product into a box. Each activity can have one or more inputs 306 and one or more outputs 308.

The exemplary production order 302 includes a make activity 310. Upon completion of this activity, a second make activity 312 is to be performed. Once the make operations are completed, the product can be inputted into a pack activity 314 where it is to be packaged for release. In the production lot 304, a make operation 316 represents the execution of the make activity 310. A make operation 318 corresponds to the execution of the make activity 312. A pack activity 320 corresponds to the execution of the pack activity 314. Inputs 319 and outputs 321 respectively correspond to the inputs 306 and the outputs 308.

In this data model, the make operation 318 may be configured so that it usually has one or more outputs, similar to the outputs 321. When the make operation is followed by a move or a pack operation, which are not traditional manufacturing-type operations, the output may instead be associated with the move or the pack operation. This is because inventory is to be updated when the final product is available for use, as opposed to when the product is produced in the production plant.

Figure 4:
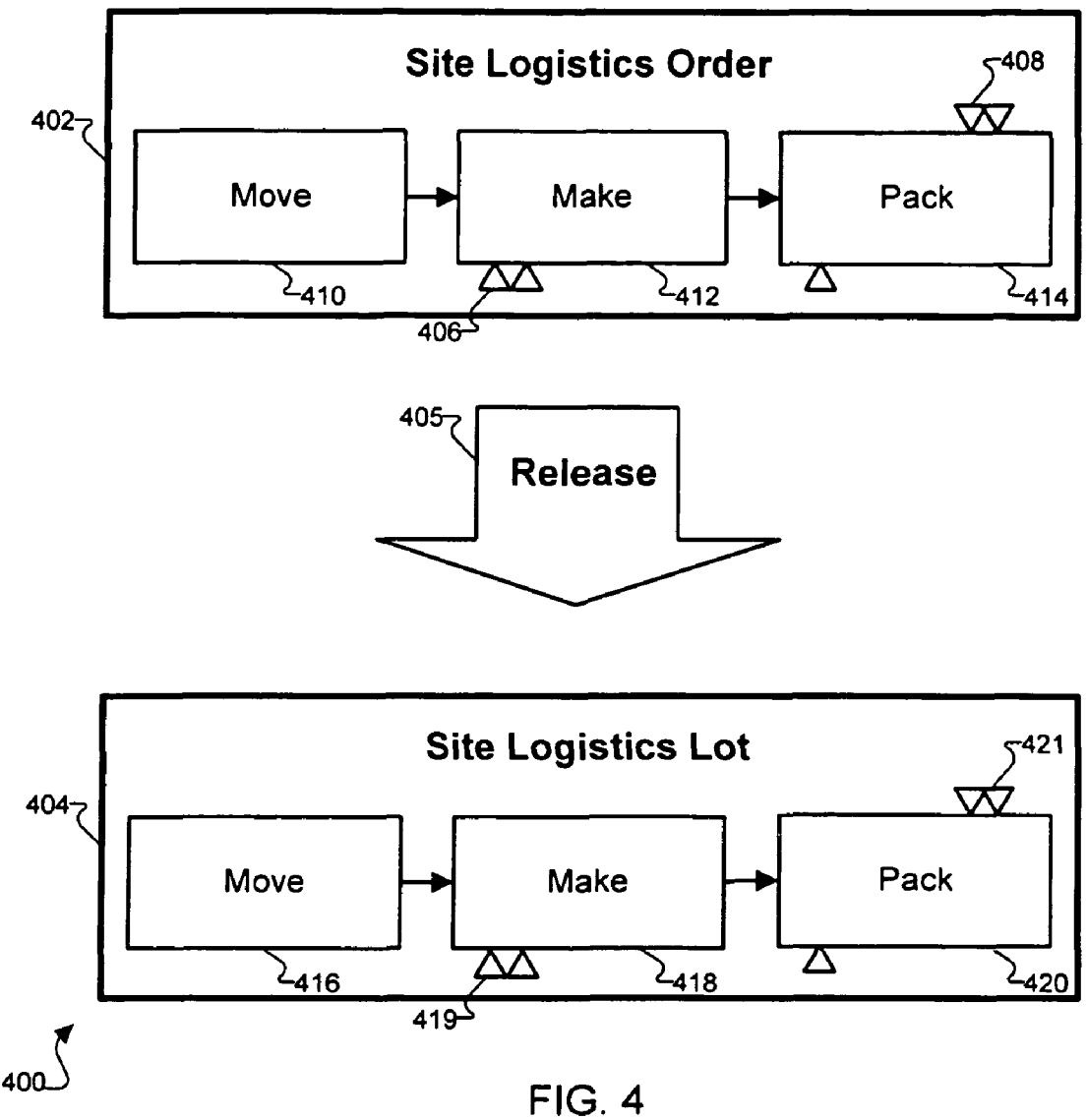
FIG. 4 shows an example of a procedure that can be performed in a warehouse environment.

FIG. 4 schematically shows an example of information that can be used in executing one or more physical operations. Information 400 contains a site logistics order 402 and a site logistics lot 404. The site logistics order 402 is an object that is used to model and describe site logistics processes. In particular, the site logistics order 402 defines which components and resources are required to perform activities. The site logistics lot 404 is an object that is used to execute the site logistics processes. The site logistics lot 404 may collect data for a site logistics process and may document its progress. The site logistics lot 404 may be generated when the site logistics order 402 is released as shown by an arrow 405. Both the site logistics order 402 and the site logistics lot 404 contain operations. The operations may be production type operations or warehouse type operations or a combination of both. Each operation includes at least one activity. Exemplary activities include making a component for a product or packing the finished product into a box. Each activity can have one or more inputs 406 and one or more outputs 408.

The exemplary site logistics order 402 includes a move activity 410. Upon completion of this activity, a make activity 412 is to be performed. Once the move and make operations are completed, the product can be inputted into a pack activity 414 where it is to be packaged for release. In the site logistics lot 404, a move operation 416 represents the execution of the move activity 410. A make operation 418 corresponds to the execution of the make activity 412. A pack activity 420 corresponds to the execution of the pack activity 414. Inputs 419 and outputs 421 respectively correspond to the inputs 406 and the outputs 408.

In this data model, the make operation 418 may be configured so that it usually has one or more outputs, similar to the outputs 421. When the make operation is followed by a move or a pack operation, which are not traditional manufacturing-type operations, the output may instead be associated with the move or the pack operation. This is because inventory is to be updated when the final product is available for use, as opposed to when the product is produced in the site logistics plant.

Figure 5:
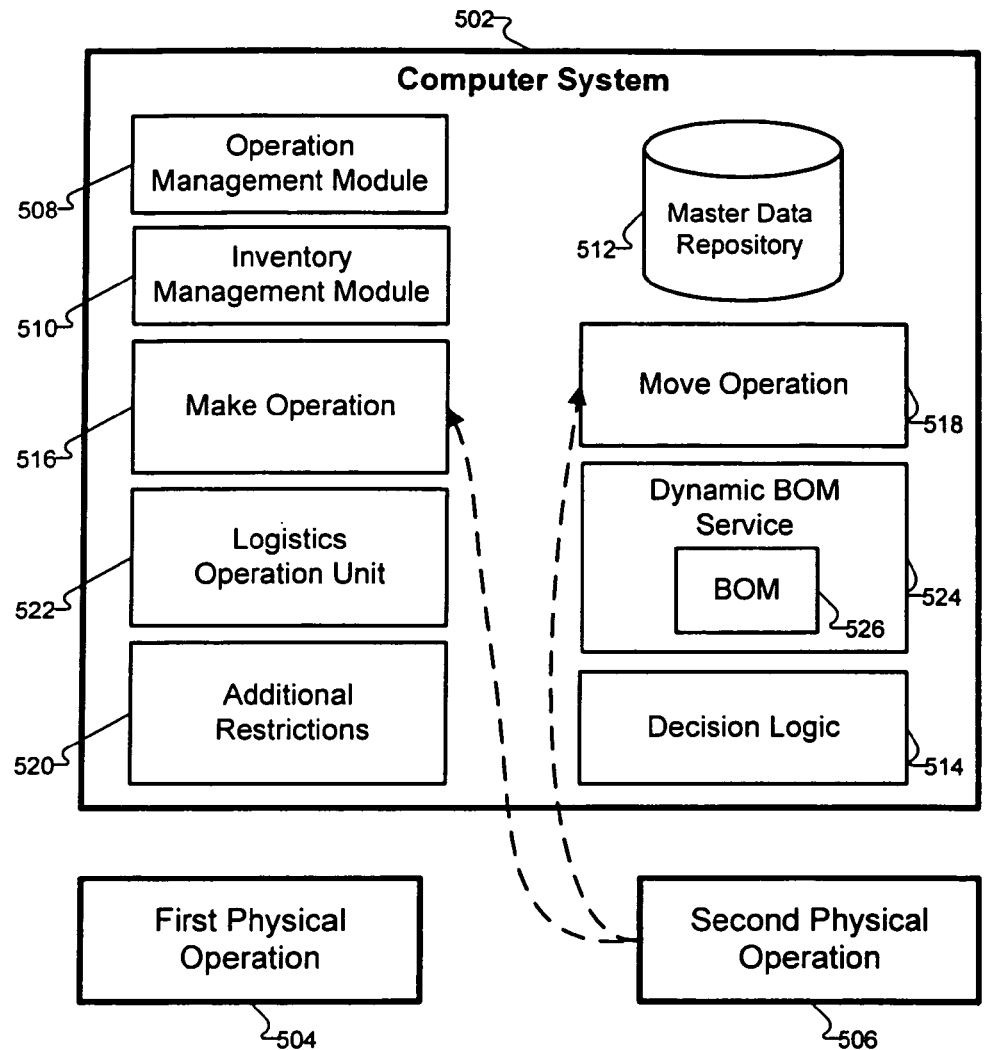
FIG. 5 is a block diagram of a computer system that manages the performance of procedures.

FIG. 5 shows an exemplary system 500 that can be used in managing the performance of procedures in the production plant 106 or the warehouse facility 108, or both. The system 500 includes a computer system 502 that can plan, execute and document at least a first physical operation 504 and a second physical operation 506. The first physical operation 504 may be a manufacturing-type operation such as transforming the material of a product. The second physical operation 506 may be a warehousing-type operation such as packing product into boxes for shipping. Each of the types of physical operations may occur in either a manufacturing-type facility or a warehouse type facility. For example, the first physical operation 504 may be for a manufacturing step in the warehouse 108 and the second physical operation 506 may be for a moving operation in the production plant 106.

The computer system 502 includes an operation management module 508 that provides shared access to an inventory management module 510 and a master data repository 512. The operation management module 508 may utilize data in the master data repository 512 to schedule or carry out physical operations. This applies to both the make-type operations and the move-type operations. Further, the computer system 502 can maintain a shared inventory between the manufacturing type and warehouse type operations. The operation management module 508 can include the logistics execution module 200 or may otherwise work with the production objects shown in the production processing module 210 or the site logistics objects shown in the site logistics module 220, or both.

Sometimes, there needs to be decided whether to execute a given physical operation as one type of operation, or whether to use another one. For example, assume that the second physical operation 506 could be performed either as a make-type operation 516 that transforms a material of the product or as a move-type operation 518 that transforms a logistic operations object associated with the product. Decision logic 514 may be automatically applied by the system 502 to determine how the operations within the request objects can be carried out. For example, the decision logic 514 can decide to use the make-type operation 516 if the production aspects of the operation predominate, and otherwise use the move-type operation 518.

Sometimes, additional restrictions 520 may be applied to an operation when it is performed in a type of process that usually includes only other types of operations. For example, when a move operation is performed within the production plant 106, the additional restrictions 520 can be applied. For instance, the move operation may be performed in the warehouse 108 by an operator using a forklift without the additional restriction 520. In contrast, when the move operation is performed in the production plant 106, the additional restriction 520 may require use of an operator with a cart if a forklift is not available in the production plant.

The exemplary computer system 502 includes a logistics operation unit 522 for defining an object that describes the warehousing or logistics aspects of a product or package. The information contained in the logistics operation unit 522 may be used in the processes of storing, moving or packing a product. For example, the logistics operation unit 522 can generate a logistic operation object for a given product.

The exemplary computer system 502 also includes a dynamic BOM service 524 that generates a packing bill of material (BOM) 526 for make-to-order or assemble-to-order products. Packing-type operations may involve updating the logistic operations object for the product being packed. In order-based implementations, the order object can include the logistics operations object. The order management module 508 may dynamically determine the BOM 526 that includes a structured list of the components that make up a product and the materials included when shipping a product.

Figure 6:
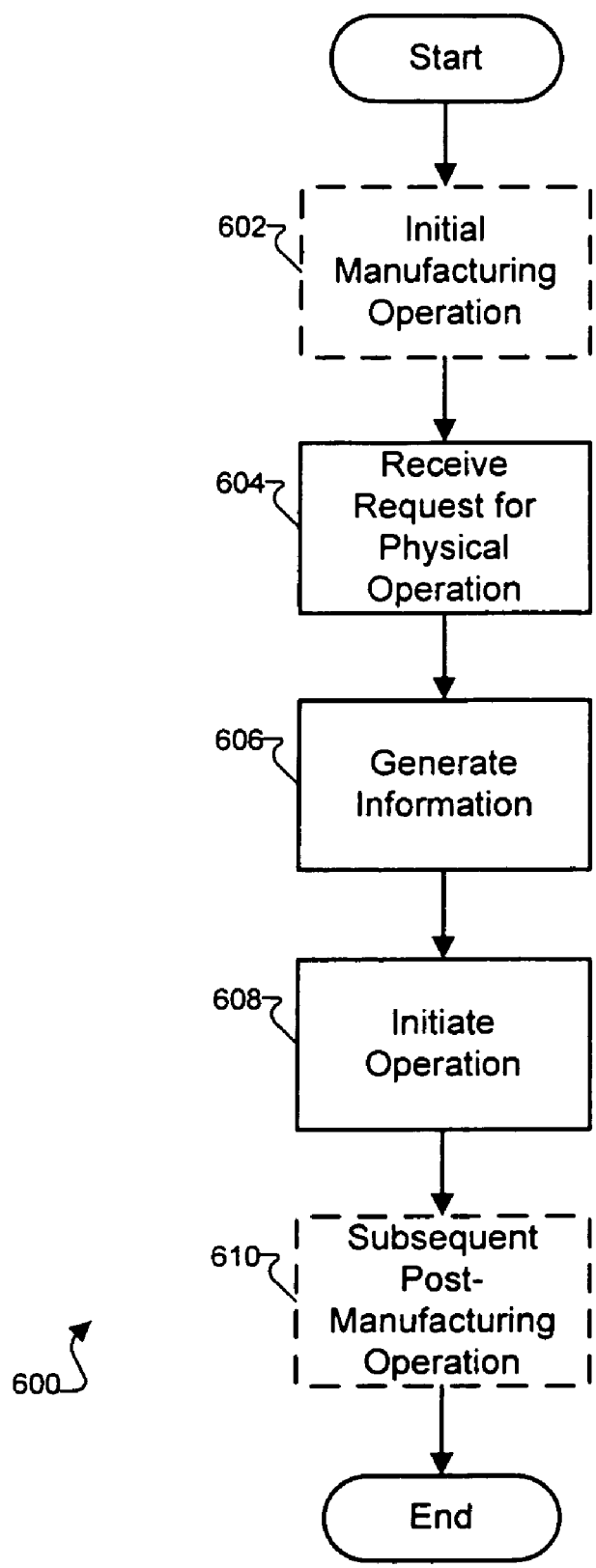
FIG. 6 is a flow chart of exemplary operations that can be performed in the context of a production plant or a warehouse facility, or both.

FIG. 6 is a flow chart of exemplary operations 600 that can be performed in the production plant 106 or the warehouse 108, or both. The operations 600 can be performed by a processor executing instructions stored in a computer program product. Some of the steps in the operations 600 are optional. For example, steps 602-608 may be performed in a process that involves a make activity in the warehouse 108, because the steps for the activity (steps 604-608) are preceded by the manufacturing operation(s) 602, which may be performed at the production plant. Similarly, steps 604-610 may be performed in a process that involves a move or pack activity in a production plant, because the steps for the activity (steps 604-608) precede the post-manufacturing operation(s) 610, which may be performed at the warehouse.

The operations 600 may begin in optional step 602 with an initial manufacturing operation performed on a material or product. In step 604 the operations 600 include receiving, in a computer system, a request to initiate a manufacturing procedure for a product. The manufacturing procedure includes at least a first physical operation modeled as a manufacturing-type operation in the computer system and a second physical operation modeled as a warehouse type operation in the computer system. For example, the site logistics request 222 can be received, requesting that the site logistics order 402 be performed.

In step 606, the operations comprise generating, in response to the request, information to be used in the manufacturing procedure, the information identifying the manufacturing-type operation and the warehouse type operation. For example, the site logistics order 402 or the site logistics lot 404, or both, can be generated. Next, in step 608, the operations comprise initiating, using the information, the manufacturing procedure including the first and second physical operations. For example, the make activity 412 and the pack activity 414 can be initiated. Upon receipt of this information, the operations to fulfill the request may be initiated.

Figure 7:
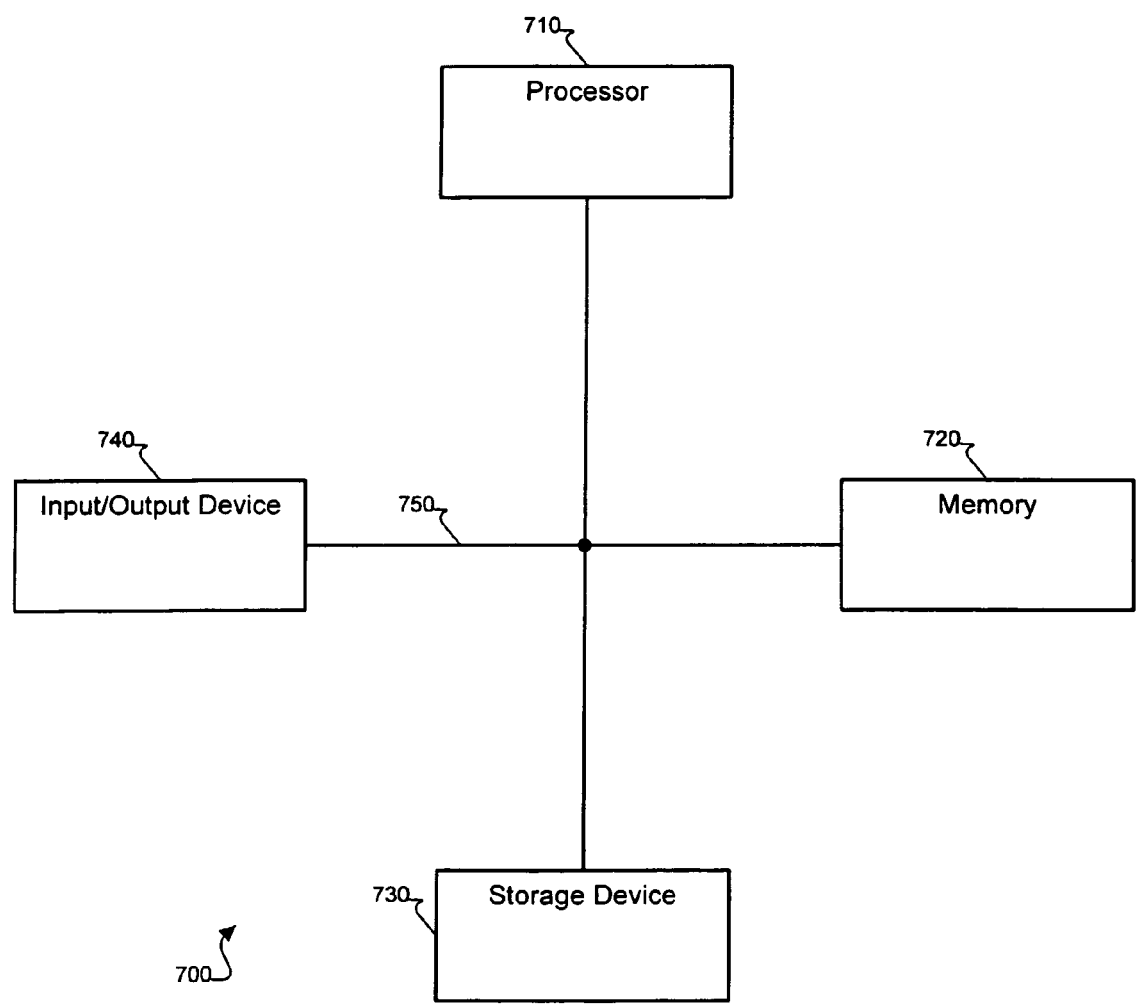
FIG. 7 is a block diagram of a general computer system.

FIG. 7 is a block diagram of a computer system 700 that can be used in the operations described above, according to one embodiment. For example, the system 700 may be included in either of the computer environment 102 or the computer system 500.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one embodiment, the processor 710 is a single-threaded processor. In another embodiment, the processor 710 is a multi-threaded processor. The processor 710 is capable of processing instructions stored in the memory 720 or on the storage device 730 to display graphical information for a user interface on the input/output device 740.

The memory 720 stores information within the system 700. In one embodiment, the memory 720 is a computer-readable medium. In one embodiment, the memory 720 is a volatile memory unit. In another embodiment, the memory 720 is a non-volatile memory unit.

The storage device 730 is capable of providing mass storage for the system 700. In one embodiment, the storage device 730 is a computer-readable medium. In various different embodiments, the storage device 730 may be a floppy disk device, a hard disk device, an optical disk device, or a tape device.

The input/output device 740 provides input/output operations for the system 700. In one embodiment, the input/output device 740 includes a keyboard and/or pointing device. In one embodiment, the input/output device 740 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method to be performed in a procedure of manufacturing a product, the method comprising:
   receiving, in a computer system, a request to initiate a manufacturing procedure for a product, the manufacturing procedure including at least (i) a first physical operation that is to be performed on the product and that is modeled as a manufacturing-type operation in the computer system, and (ii) a second physical operation that is to be performed on the product and that is modeled as a warehouse-type operation in the computer system, wherein the manufacturing procedure is one of a plurality of manufacturing procedures that the computer system is configured to initiate;

generating, by the computer system, a manufacturing-warehouse execution object instance for the manufacturing procedure in response to the received request, wherein the generated manufacturing-warehouse execution object instance is configured to be executed by the computer system to perform both the manufacturing-type operation and the warehouse-type operation for the manufacturing procedure, wherein the computer system is configured to generate a separate manufacturing-warehouse execution object instance for each of the plurality of manufacturing procedures;

wherein the manufacturing-warehouse execution object is generated to include (i) a production processing component that includes a plurality of first objects for performing the first physical operation and (ii) a site logistics processing component that includes a plurality of second objects for performing the second physical operation;

wherein the plurality of first objects of the production processing component comprises (i) a production request object that includes timing information for the first physical operation and that interfaces with a first entity that requested performance of the first physical operation, (ii) a production order object that identifies one or more first resources that will perform the first physical operation, (iii) a production lot object that directs performance of the first physical operation and that collects data from the one or more first resources to document progress of the first physical operation, (iv) a production task object that organizes the first physical operation into one or more self-contained work items for the one or more first resources, and (v) a production confirmation object that confirms changes to the first physical operation and updates information associated with the first physical operation to reflect the changes;

wherein the plurality of second objects of the site logistics processing component comprises (i) a site logistics request object that includes timing information for the second physical operation and that interfaces with a second entity that requested performance of the second physical operation, (ii) a site logistics order object that identifies one or more second resources that will perform the second physical operation, (iii) a site logistics lot object that directs performance of the second physical operation and that collects data from the one or more second resources to document progress of the second physical operation, (iv) a site logistics task object that organizes the second physical operation into one or more self-contained work items for the one or more second resources, and (v) a site logistics confirmation object that confirms changes to the second physical operation and updates information associated with the second physical operation to reflect the changes; and initiating, by the computer system, the manufacturing procedure including the first and second physical operations by executing the generated manufacturing-warehouse execution object instance using the production processing component and the site logistics processing component.

2. The method of claim 1, wherein the first physical operation is a make-type operation that transforms a material of the product and wherein the second physical operation is a pack-type operation that transforms a logistic operations object associated with the product.

3. The method of claim 2, further comprising including the logistic operations object in the production order object upon the generation of the production order object.

4. The method of claim 3, further comprising dynamically determining, by the computer system, a bill of materials for the logistic operations object.

5. The method of claim 3, further comprising evaluating, by the computer system, at least one additional restriction on the pack-type operation that the computer system applies for use of the pack-type operation in the manufacturing procedure.

6. The method of claim 2, wherein (1) the make-type operation is modeled such that, when it is used without the pack-type operation, the make-type operation is associated with an output in the computer system, and (2) the make-type operation precedes the pack-type operation in the manufacturing procedure, and wherein the method further comprises associating the output with the pack-type operation instead of with the make-type operation.

7. The method of claim 1, wherein the first physical operation is a make-type operation that transforms a material of the product and wherein the second physical operation is a move-type operation that physically moves the product.

8. The method of claim 1, wherein the second physical operation is such that it can be performed in the manufacturing procedure either as the manufacturing-type operation or as the warehouse-type operation, further comprising automatically applying decision logic to select one of the types for the second physical operation.

9. The method of claim 8, wherein automatically applying the decision logic involves deciding whether to perform the second physical operation as a make-type operation that transforms a material of the product or as a pack-type operation that transforms a logistic operations object associated with the product.

10. The method of claim 1, wherein the manufacturing procedure is performed upon the initiation and results in the product being manufactured, and wherein the method further comprises performing at least one additional physical operation on the manufactured product in a warehouse, the at least one additional physical operation being modeled as a warehouse-type operation in the computer system.

11. A method to be performed in a procedure of managing a product, the method comprising:

receiving, in a computer system, a request to initiate a post-manufacturing procedure for a product, the post-manufacturing procedure including at least (i) a first physical operation that is to be performed on the product and that is modeled as a manufacturing-type operation in the computer system and (ii) a second physical operation that is to be performed on the product and that is modeled as a warehouse-type operation in the computer system, wherein the post-manufacturing procedure is one of a plurality of post-manufacturing procedures that the computer system is configured to initiate;

generating, by the computer system, a manufacturing-warehouse execution object instance for the post-manufacturing procedure in response to the received request, wherein the generated manufacturing-warehouse execution object instance is configured to be executed by the computer system to perform both the manufacturing-type operation and the warehouse-type operation for the manufacturing procedure, wherein the computer system is configured to generate a separate manufacturing-warehouse execution object instance for each of the plurality of post-manufacturing procedures;

wherein the manufacturing-warehouse execution object is generated to include (i) a production processing component that includes a plurality of first objects for performing the first physical operation and (ii) a site logistics processing component that includes a plurality of second objects for performing the second physical operation;

wherein the plurality of first objects of the production processing component comprises (i) a production request object that includes timing information for the first physical operation and that interfaces with a first entity that requested performance of the first physical operation, (ii) a production order object that identifies one or more first resources that will perform the first physical operation, (iii) a production lot object that directs performance of the first physical operation and that collects data from the one or more first resources to document progress of the first physical operation, (iv) a production task object that organizes the first physical operation into one or more self-contained work items for the one or more first resources, and (v) a production confirmation object that confirms changes to the first physical operation and updates information associated with the first physical operation to reflect the changes;

wherein the plurality of second objects of the site logistics processing component comprises (i) a site logistics request object that includes timing information for the second physical operation and that interfaces with a second entity that requested performance of the second physical operation, (ii) a site logistics order object that identifies one or more second resources that will perform the second physical operation, (iii) a site logistics lot object that directs performance of the second physical operation and that collects data from the one or more second resources to document progress of the second physical operation, (iv) a site logistics task object that organizes the second physical operation into one or more self-contained work items for the one or more second resources, and (v) a site logistics confirmation object that confirms changes to the second physical operation and updates information associated with the second physical operation to reflect the changes; and initiating, by the computer system, the post-manufacturing procedure including the first and second physical operations by executing the generated manufacturing-warehouse execution object instance using the production processing component and the site logistics processing component.

12. The method of claim 11, wherein the first physical operation is a make-type operation that transforms a material of the product and wherein the second physical operation is a move-type operation that physically moves the product.

13. The method of claim 11, wherein the second physical operation is such that it can be performed in the post-manufacturing procedure either as the manufacturing-type operation or as the warehouse-type operation, further comprising automatically applying decision logic to select one of the types for the second physical operation.

14. The method of claim 13, wherein automatically applying the decision logic involves deciding whether to perform the second physical operation as a make-type operation that transforms a material of the product or as a pack-type operation that transforms a logistic operations object associated with the product.

15. The method of claim 11, wherein the post-manufacturing procedure is performed in a warehouse after performance of a manufacturing procedure in a production plant, and wherein the method further comprises performing at least one initial physical operation on the product in the manufacturing procedure, the at least one initial physical operation being modeled as a manufacturing-type operation in the computer system.

16. A computer program product tangibly embodied in a computer readable storage medium and containing executable instructions that when executed cause a processor to perform operations to generate:

a manufacturing-warehouse execution object instance that is configured to be executed by a computer system to perform both a manufacturing-type operation modeled as a first physical operation and a warehouse-type operation modeled as a second physical operation for a manufacturing procedure, wherein the manufacturing procedure is one of a plurality of manufacturing procedures that the computer system is configured to initiate, and wherein the computer system is configured to generate a separate manufacturing-warehouse execution object instance for each of the plurality of manufacturing procedures;

wherein the manufacturing-warehouse execution object is generated to include (i) a production processing component that includes a plurality of first objects for performing the first physical operation and (ii) a site logistics processing component that includes a plurality of second objects for performing the second physical operation;

wherein the plurality of first objects of the production processing component comprises (i) a production request object that includes timing information for the first physical operation and that interfaces with a first entity that requested performance of the first physical operation, (ii) a production order object that identifies one or more first resources that will perform the first physical operation, (iii) a production lot object that directs performance of the first physical operation and that collects data from the one or more first resources to document progress of the first physical operation, (iv) a production task object that organizes the first physical operation into one or more self-contained work items for the one or more first resources, and (v) a production confirmation object that confirms changes to the first physical operation and updates information associated with the first physical operation to reflect the changes;

wherein the plurality of second objects of the site logistics processing component comprises (i) a site logistics request object that includes timing information for the second physical operation and that interfaces with a second entity that requested performance of the second physical operation, (ii) a site logistics order object that identifies one or more second resources that will perform the second physical operation, (iii) a site logistics lot object that directs performance of the second physical operation and that collects data from the one or more second resources to document progress of the second physical operation, (iv) a site logistics task object that organizes the second physical operation into one or more self-contained work items for the one or more second resources, and (v) a site logistics confirmation object that confirms changes to the second physical operation and updates information associated with the second physical operation to reflect the changes;

an operation management module for managing operations performed with regard to a product, the operation management module being configured for managing the first physical operation and the second physical operation using the production processing component and the site logistics processing component of the manufacturing-warehouse execution object;
a first initiation component configured to initiate the first physical operation upon being triggered by the operation management module; and
a second initiation component configured to initiate the second physical operation upon being triggered by the operation management module.

17. The computer program product of claim 16, wherein the operation management module uses the production request object and the site logistics object, and the production lot object and the site logistics lot object for triggering each of the initiation components to initiate their respective physical operations, the production request object and the site logistics object corresponding to a request to initiate the physical operations and the production lot object and the site logistics lot object being configured to represent performance of the physical operation.

18. The computer program product of claim 17, wherein the production order object further describes the first physical operation and the site logistics order object further describes the second physical operation, and wherein the production task object further corresponds to a first predefined task that is a portion of the first physical operation and the site logistics task object further corresponds to a second predefined task that is a portion of the second physical operation.

19. The computer program product of claim 16, wherein executing the executable instructions causes the processor to perform operations to further generate a master data repository that is shared for use with the first and second physical operations.

20. The computer program product of claim 16, wherein executing the executable instructions causes the processor to perform operations to further generate an inventory management module that is shared for use with the first and second physical operations.

21. The method of claim 1, wherein the manufacturing-warehouse execution object is generated to further include (i) an inbound deliver processing component that manages receipt of goods from one or more vendors and communication with the one or more vendors, the goods to be used in the first physical operation or the second physical operation, (ii) an outbound delivery processing component that manages delivery to one or more recipients of products manufactured using the first physical operation or the second physical operation, and (iii) a material inspection processing component that manages planning and execution of quality inspections for the products manufactured using the first physical operation or the second physical operation.

* * * * *